US008223656B2

(12) United States Patent
Rius i Riu et al.

(10) Patent No.: US 8,223,656 B2
(45) Date of Patent: Jul. 17, 2012

(54) DISTRIBUTED RESOURCE MANAGEMENT FOR MULTI-SERVICE, MULTI-ACCESS BROADBAND NETWORKS

(75) Inventors: Jaume Rius i Riu, Vällingby (SE); Elmar Trojer, Täby (SE); Jonas Emanuel Rosenberg, Sollentuna (SE); Jonathan Olsson, Sollentuna (SE); Miguel Berg, Upplands Väsby (SE); Inigo Pinilla, Getxo (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 523 days.

(21) Appl. No.: 12/528,761

(22) PCT Filed: Feb. 27, 2007

(86) PCT No.: PCT/IB2007/000477
§ 371 (c)(1),
(2), (4) Date: Aug. 26, 2009

(87) PCT Pub. No.: WO2008/104821
PCT Pub. Date: Sep. 4, 2008

(65) Prior Publication Data
US 2010/0061249 A1    Mar. 11, 2010

(51) Int. Cl.
*H04L 1/00* (2006.01)
*G06F 15/173* (2006.01)
(52) U.S. Cl. .................. 370/241; 370/242; 709/224
(58) Field of Classification Search .................. None
See application file for complete search history.

(56) References Cited

U.S. PATENT DOCUMENTS

| | | | |
|---|---|---|---|
| 6,711,135 B1 * | 3/2004 | Dziekan et al. | 370/242 |
| 7,881,219 B2 * | 2/2011 | Trojer | 370/252 |
| 2002/0003806 A1 | 1/2002 | McKinnon et al. | |
| 2002/0039352 A1 | 4/2002 | El-Fekih et al. | |
| 2007/0014242 A1 * | 1/2007 | Claes et al. | 370/241 |
| 2007/0061443 A1 * | 3/2007 | Chavda | 709/224 |
| 2008/0056240 A1 * | 3/2008 | Ellis et al. | 370/352 |
| 2009/0175199 A1 * | 7/2009 | Trojer | 370/254 |

OTHER PUBLICATIONS

ETSI: draft ETSI TS 182 019 v0.3.3 (Dec. 2006). Telecommunications and Internet Converged Services and Protocols for Advanced Networking (TISPAN); Resource and Admission Control Sub-system (RACS): Functional Architecture; Release 2 ETSI, Dec. 31, 2006.
Cho et al: "SIP-based Qos support architecture and session management in a combined IntServ and DiffServ networks" Computer Communications, Elsevier Science Publishers BV. Amsterdam, NL, vol. 29, No. 15, Sep. 5, 2006, pp. 2996-3009.

* cited by examiner

*Primary Examiner* — Kevin C Harper

(57) ABSTRACT

A qualification and monitoring function (604, 606) monitors the line conditions of a last mile access network that is connected with a multi-access broadband network. The qualification and monitoring function (604, 606) sends data to a Resource Manager (602) of the access network upon request. The monitoring function collects, stores, and analyzes performance data, media conditions and stability data using interpretation filters to derive performance indicators. The conditions of the network are also automatically provided to the resource manager (602) for immediate attention if the access network conditions exceed predetermined thresholds.

23 Claims, 9 Drawing Sheets

DISTRIBUTED RESOURCE MANAGEMENT FOR MULTI-SERVICE, MULTI-ACCESS BROADBAND NETWORKS

BACKGROUND OF THE INVENTION

Today's broadband networks are constructed of an interconnection of different transport technologies used for different parts of the network such as access, aggregation, transport, and feeding.

The following is a list of acronyms used in the body of the specification and their definitions, which shall apply throughout the specification unless otherwise noted.

Acronyms:
ADSL Asymmetric Digital Subscriber Line
ATM Asynchronous Transfer Mode
B2B Business to Business
E2E End to End
DSL Digital Subscriber Line
FTTx Fiber To The x=Home, Node, Cabinet, Building, Curb
GbE Gigabit Ethernet
GPON Gigabit-capable Passive Optical Networks
GSM Global System for Mobile Communications
HDTV High Definition Television
IP Internet Protocol
IPTV Internet Protocol Television
IPDSLAM Internet Protocol Digital Subscriber Line Access Multiplexer
LQ&M Loop Qualification and Monitoring
MPLS Multi-Protocol Label Switching
OAM Operation Administration and Maintenance
OPEX Operational Expenditure
PoP Point of Presence
PVC Permanent Virtual Circuit
QoE Quality of Experience
QoS Quality of Service
RM Resource Manager
RPC Remote Procedure Call
SLA Service Level Agreement
SOAP Simple Object Access Protocol
SNMP Simple Network Management Protocol
VDSL Very High Speed Digital Subscriber Line
VLAN Virtual Local Area Network
VoIP Voice over IP
WCDMA Wide-band Code Division Multiple Access
xDSL DSL variants (ADSL, SDSL, etc.)

FIG. 1 depicts a high-level block diagram of a broadband network that is constructed of an interconnection of different transport technologies used for different parts of the network. Network connectivity is supported also by a huge number of different connectivity technologies and network protocols. In order for services to be delivered from an operator point of presence (PoP) to the customer premises with a required quality of service, several technologies, and protocols have to work together end-to-end.

In such a scenario, a unified operation, administration and management (OAM) system covering the whole workflow from service subscription and service provisioning to service quality maintenance has to interface with all network-parts, which is mostly non-standardized and therefore hard to implement. For the wire-line sector such a system is not standardized and it is up to the wire-line operators to fix their own OAM system solution.

Existing wire-line broadband solutions have limitations in supporting features like QoS, mobility and security because there is no unified standardized architecture such as in the mobile sector with GSM or WCDMA (ETSI, 3GPP). Interface descriptions between different technologies are proprietary and non-standardized. This leads to a very scattered workflow when providing services to users and thus to a rather fixed service provisioning models, which leads to broadband network shortcomings, including:

No flexible end to end (e2e) service provisioning
Low grade of business to business (b2b) interface implementation
Low e2e QoS management and SLA assurance
Missing interfaces, protocols for automation
Low grade of automation during service provisioning, high OPEX
Problematic service offer extension
No control and/or feedback from the end user about the QoE (perceived QoS by the end user)

U.S. Patent Application Publication No. 2002/0039352 discloses a system and method for managing a service in a communication network. A service management system collects quality and/or performance data from the network and compares the collected data with quality and/or performance requirements obtained from a client. A service may be managed by verifying that the network is providing an expected level of service. The service management system, however, appears to communicate with the network using existing, non-standardized interfaces because the larger problem is not discussed or contemplated.

The ETSI Technical Specification, ETSI TS 182 019 v0.3.3 (2006-12) entitled, "Telecommunications and Internet Converged Services and Protocols for Advanced Networking (TISPAN); Resource and Admission Control Sub-system (RACS); Functional Architecture; Release 2" discusses matters related to resource and admission control, but also appears not to contemplate the problem caused by non-standard interfaces between the performance monitor in the access network and the resource manager in the core network.

It would be advantageous to have a system and method for managing access networks connecting to broadband networks that overcomes the disadvantages of the prior art. The present invention provides such a system and method.

BRIEF SUMMARY OF THE INVENTION

A monitoring function monitors the line conditions of an access network that is connected with a multi-access broadband network. The monitoring function sends data to a Resource Manager (RM) of the access network upon request or following a predetermined timetable. The monitoring function collects, stores, and analyzes performance data, line conditions and stability data using interpretation filters to derive performance indicators. The conditions of the network are also automatically provided to the resource manager for immediate attention if the access network conditions exceed predetermined thresholds.

Quality of Service (QoS) and nomadism are monitored end-to-end by a distributed Resource Management function, a Loop Qualification and Monitoring (LQ&M) function/tool (hereinafter, "tool"). Local resource managers responsible for bounded parts of a network are in place and cooperating in order to establish and implement global (network wide) QoS policies and guarantees. An access network Resource Manager is disclosed, that interfaces an access network specific Loop Qualification and Monitoring tool to get support on access network resource-related questions including line performance and stability in the access network.

The invention allows for real-time interaction between access nodes and core network management functions to maintain and guarantee QoS and Quality of Experience (QoE) for services. This interaction is enabled through web service-based interfaces.

In order to guarantee QoS for a given service-mix, it is necessary to include access network resource status information into resource management decisions during service subscription and service invocation. During service operation, status information (service quality monitoring) is used to check a Service Level Agreement (SLA), which is a means of service assurance.

The LQ&M tool pushes information to an associated RM in case the line quality has changed (line faults, change of noise-environment) so the RM can react (failure diagnoses, failure repair, automatic service reconfiguration).

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

A Digital Subscriber Line (DSL) access network is described in the specification and figures to avoid the possibility of confusion. However, those skilled in the art will recognize that various access network types and interface configurations may be used in place of the example DSL access network to accomplish the same outcome.

Figure 1:
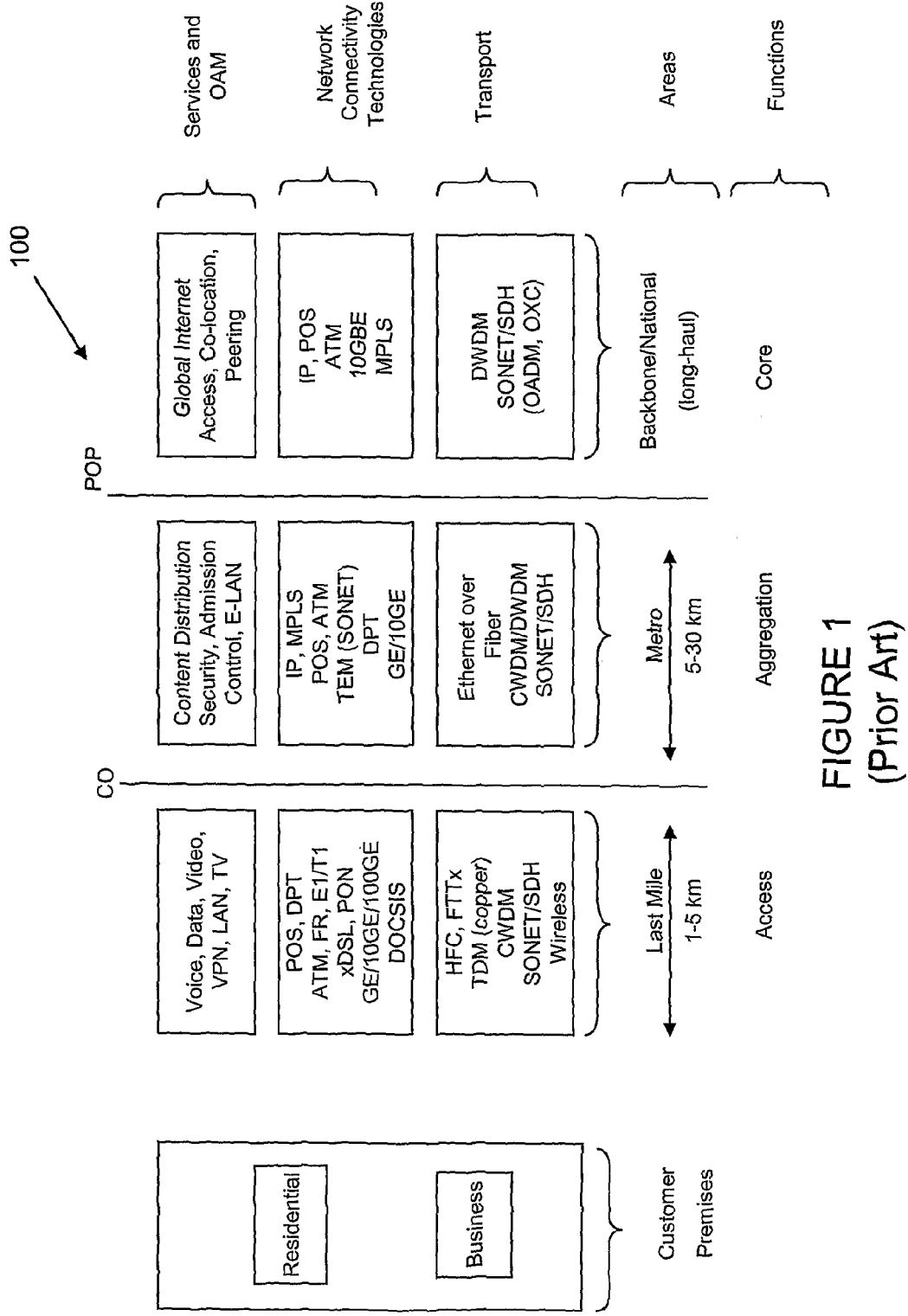
FIG. 1 depicts a high-level block diagram of a broadband network that is constructed of an interconnection of different transport technologies used for different parts of the network.
Figure 2:
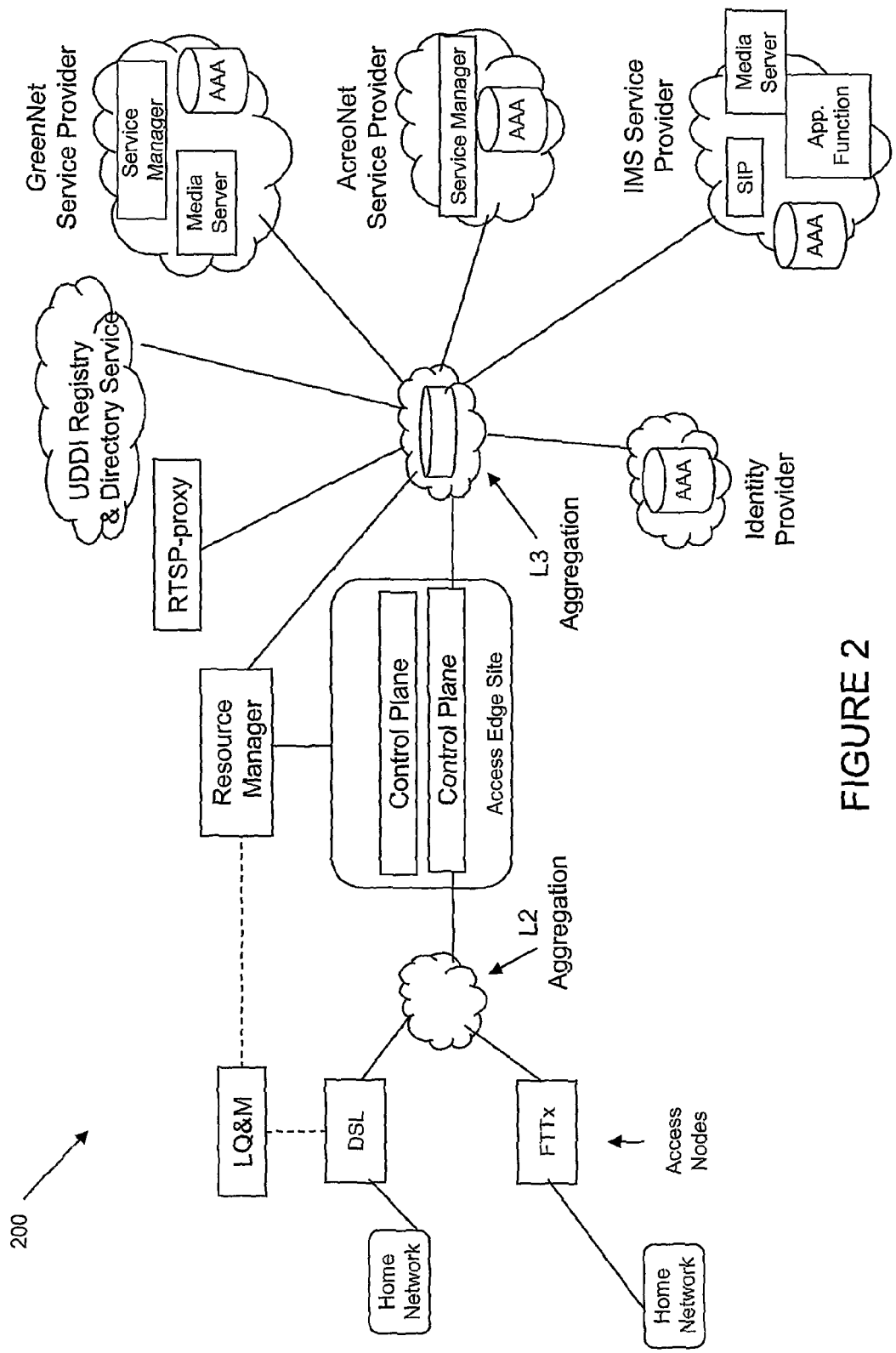
FIG. 2 depicts a block diagram of a Multi-Service, Multi-Access Network Structure for future broadband networks.

FIG. 2 depicts a possible Multi-Service, Multi-Access Network Structure 200 for future broadband networks. Future broadband wire-line networks consist of different network parts that will need to work together in order to provide multi-service and multi-access data transport. Multi-service means that different services, such as data services (Internet access, file-sharing), speech services (VoIP, voice messaging, gambling) and video-based services (IPTV, HDTV, video conferencing, gaming applications) are offered to users by different service providers.

Figure 3:
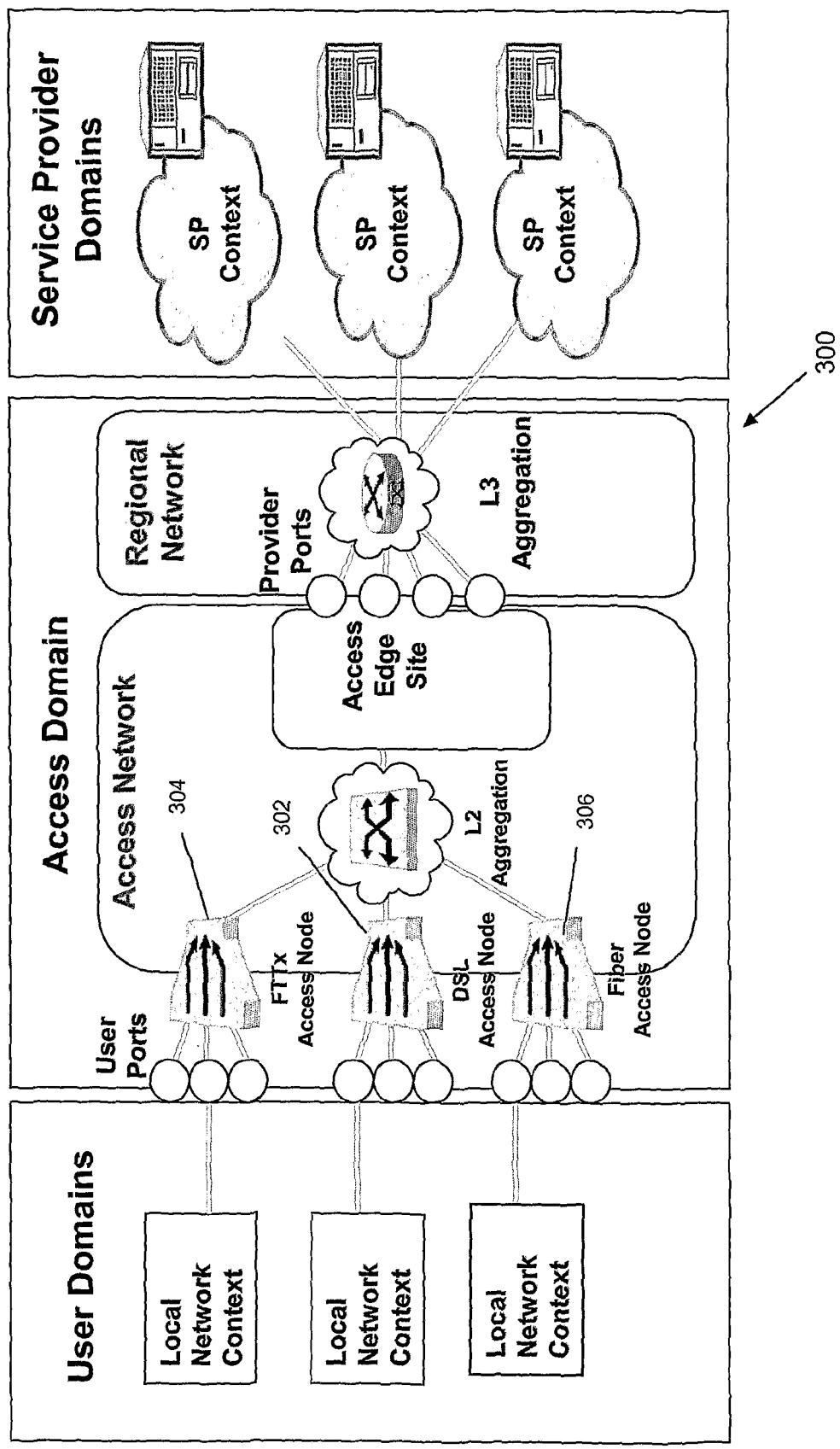
FIG. 3 illustrates an access network reference architecture through which multi-access accounts can be used to deliver services according to an embodiment of the present invention.

FIG. 3 illustrates an access network reference architecture 300 through which multi-access accounts can be used to deliver services according to an embodiment of the present invention. Typical access media that are installed and used to connect to the customer premise sides are:

Digital Subscriber Loop (DSL) 302, i.e. digital data transmission over the telephone loop via ADSL1/2/2+ or VDSL1/2;

fiber to the node, cabinet, curb, building (FTTx) architectures 304, building point-to-point or multipoint access structures using fiber connections to the proximity of the customers (BPON, GPON), bridging only the very last mile with existing telephone copper lines (VDSL2);

deep fiber to the home (FTTH) architectures 306 where fiber is used from the network providers facilities (central office) all the way to residential or enterprise networks (Gb Ethernet) and wireless connections, such as wireless local area network (WLAN) or mini-link transporting data via radio connections.

Networks are very general in terms of service-mixes, but several other important features can be supported by the structure, for instance:

Service Flow Separation—Ethernet or IP flows are used rather than fixed connections providing a maximum amount of flexibility in service and delivery constellations;

Quality of Service (QoS)—End-to-end resource negotiation, reservation and authorization means can be implemented via B2B interfaces between service and access provider and different access media allows for different grades of service, and Nomadism and Mobility: where nomadism is the ability of the user to change his network access point after moving; the flow: principle gives the possibility to access subscribed services anywhere in the access network by user authentication.

Figure 4:
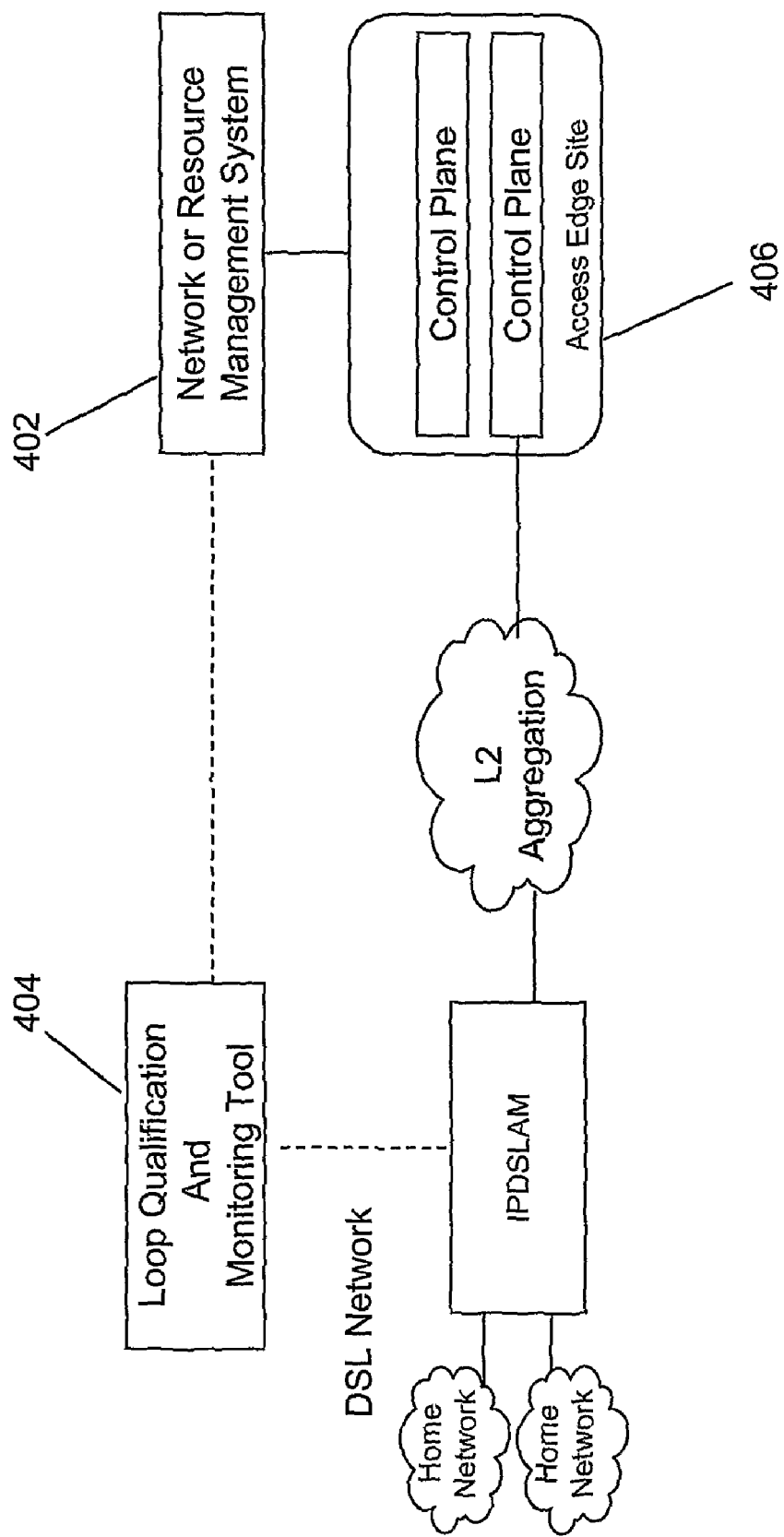
FIG. 4 depicts a Resource Manager and a Loop Qualification and Monitoring tool in accordance with an embodiment of the present invention.

FIG. 4 depicts a Resource Manager and a Loop Qualification and Monitoring tool in accordance with an embodiment of the present invention. Although DSL is a robust and cheap technology that has become the most popular first mile technology, it is known that the actual transport performance (rate, delay, frame loss rate) heavily depends on the copper quality (line length, diameter, age) and copper environment (binder sizes, connector quality, electromagnetic noise environment) and therefore varies between lines. DSL currently provides sufficient capacity for data and voice services, new services like video and gaming, etc. may require the system to operate at the limit of feasibility.

A Resource Manager (RM) 402 is connected to a DSL-specific Loop Qualification and Monitoring tool (LQ&M) 404 specially designed to classify individual DSL lines. The interface between RM 402 and LQ&M 404 supports the main RM with decisions on service subscription, resource allocation, service invocation, QoS monitoring and DSL fault localization and notification. LQ&M 404, which is responsible for a plurality of users, monitors each user's DSL link (in the DSL case) in terms of service quality, and reports that data to RM 402 in the Resource Management system situated at access edge site 406. The data is then incorporated into service decisions.

In a communication, the LQ&M 404 side runs web-services to which the client can connect at the RM side. This structure is used by RM 402 to request status data from the access network. In case LQ&M 404 needs to pro-actively notify RM 402 about a changing status in the access network, a server in the RM 402 is ready to receive connections from the LQ&M 404 client.

Figure 5:
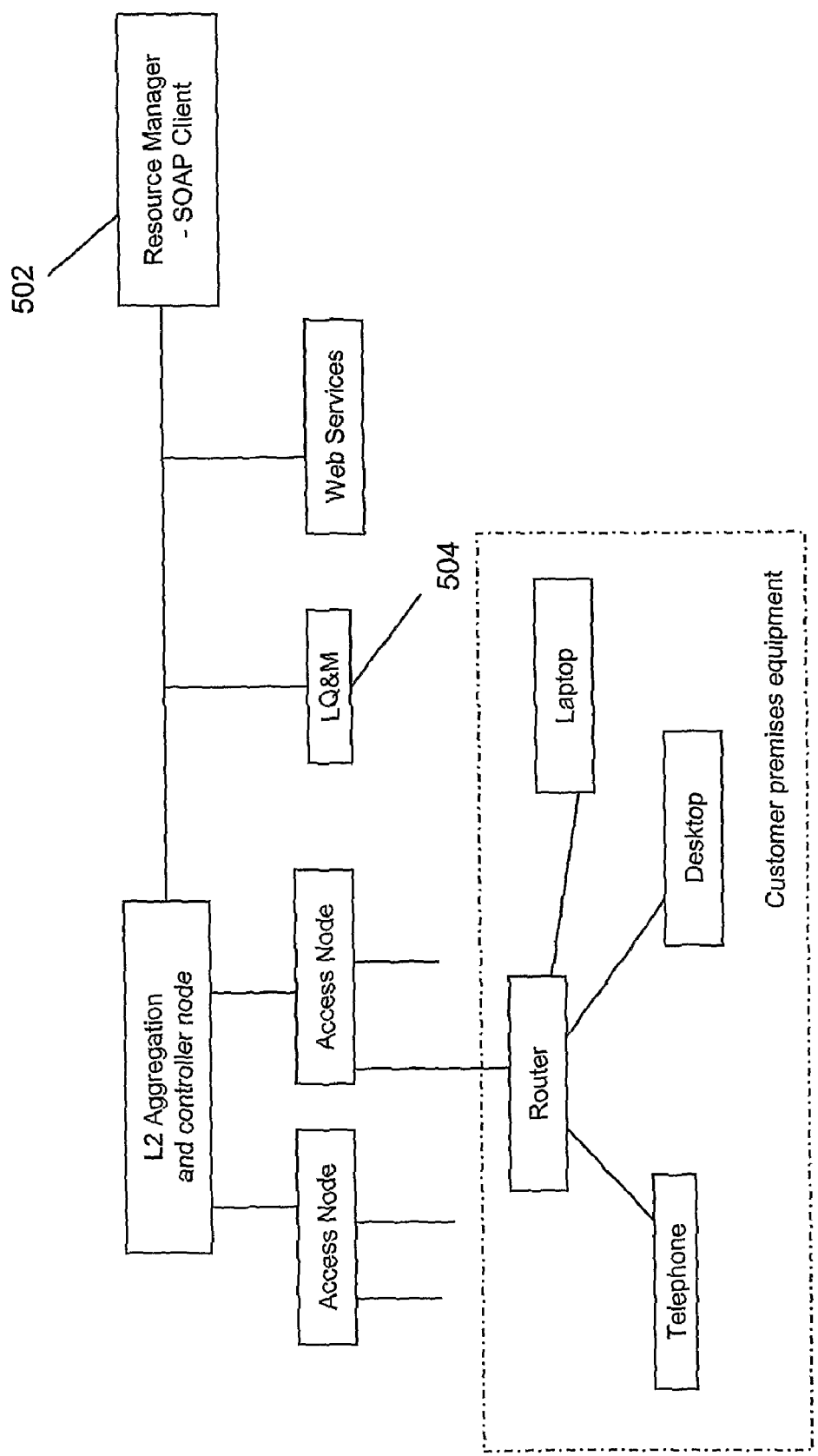
FIG. 5 is an exemplary high-level block diagram that illustrates a communication interface between the access network and the Resource Manager in accordance with an embodiment of the present invention.

FIG. 5 is an exemplary high-level block diagram that illustrates a communication interface between the access network and the Resource Manager in accordance with an embodiment of the present invention. In the present invention, Resource Manager 502 and LQ&M 504 act as either a server or a client, each function acting as a server, providing web services to the other. In order to communicate DSL line status (i.e., line 'health') towards Resource Manager 502, a SOAP protocol (in this example) is used for implementing web services. Communication in both directions is required. Resource Manager 502 can always poll the LQ&M 504 for line related status information (e.g., for QoS monitoring or during service provisioning). In this case, LQ&M 504 hosts the server offering web-service to the Resource Manager, which acts as a client; and LQ&M 504 may push urgent information (for example, line drops) to Resource Manager 502 to indicate a change in the access network. Resource Manager 502 acts as a server offering web services to LQ&M 504, which is acting as a client.

Figure 6:
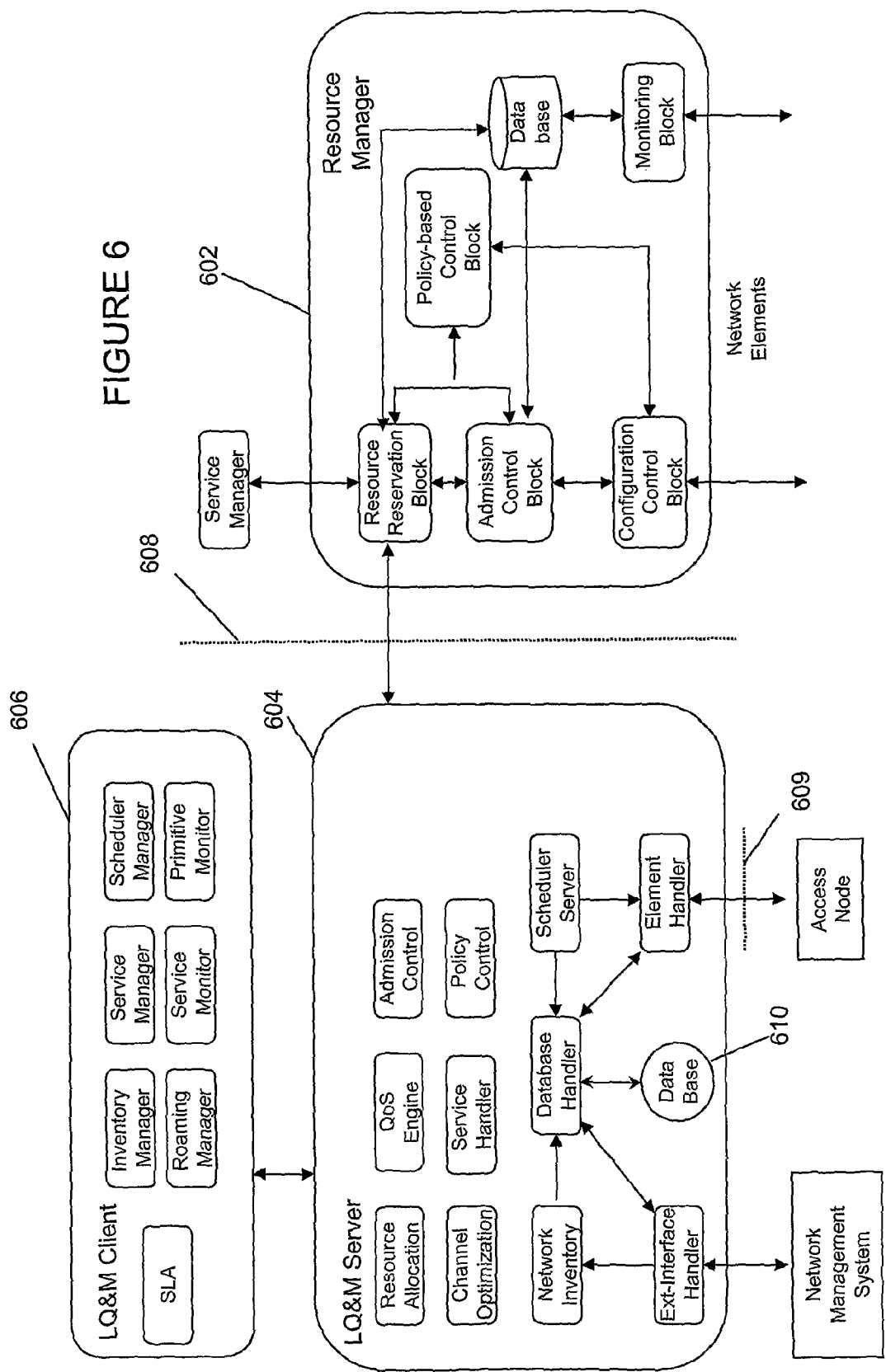
FIG. 6 depicts a high level block diagram of the resource manager, interface and LQ&M in accordance with an embodiment of the present invention.

FIG. 6 depicts a high-level block diagram of the Resource Manager (602), web service-based interface (608), and LQ&M (604, 606) in accordance with an embodiment of the present invention. LQ&M server 604 sends queries via SNMP interface 609 to the actual Access Nodes in the DSL network (not shown) to learn about the current line state (scheduled monitoring). Performance and stability data is fetched from the access node in a scheduled way and stored for statistical analysis in database 610. Several key performance indicators such as mean line rate, delay and stability-measures, are derived from the fetched source data utilizing an interpretation filter. The LQ&M server interfaces with the DSL Network Management System (NMS) in order to fetch port addressing information along with line and end-user configurations and information.

RM 602 requests data from LQ&M tool server 604 to learn about the access network state in case of admission control, policy or resource reservation decisions that have to be made.

During service delivery, LQ&M tool server 604 automatically sends notifications to RM 602 about DSL status changes for fault notification, fault diagnoses and fault repair purposes. If LQ&M tool server 604 identifies performance degradations on the DSL, RM 602 is informed so that re-prioritization and re-allocation of resources may be started. The interface 608 between RM 602 and LQ&M tool server 604 can be implemented by any generic Remote Procedure Call (RPC) interface including a SOAP interface.

Each entity (RM and LQ&M server) utilizes associated RPCs to handle the different message types listed in Table 1 below. LQ&M tool server 604 contains definitions that allow RM 602 to send request messages, whereas RM 602 holds the means to handle notification messages initiated by LQ&M tool server 604.

Table 1 shows an overview of the types of messages utilized. For "last mile" monitoring and LQ&M tool configuration request/response messages are defined. For last mile status changes, notifications are generated.

TABLE 1

Message Overview

| Request | Response | Flow |
|---|---|---|
| Access Node Status Request | Access Node Status Response | RM ≫ LQ&M ≫ RM |
| DSL Resource Status Request | DSL Resource Status Response | RM ≫ LQ&M ≫ RM |
| ATM Resource Status Request | ATM Resource Status Reply | RM ≫ LQ&M ≫ RM |
| Threshold Update Request | Threshold Update Response | RM ≫ LQ&M ≫ RM |
| Threshold Retrieve Request | Threshold Retrieve Response | RM ≫ LQ&M ≫ RM |
| Notification | | |
| LQ&M Alive | — | LQ&M ≫ RM |
| DSL Access Node Notification | — | LQ&M ≫ RM |
| DSL Line Notification | — | LQ&M ≫ RM |
| DSL Threshold Notification | — | LQ&M ≫ RM |

The following use cases outline the possible interaction between different entities during resource negotiation and service delivery, illustrating how the messages listed in Table 1 are used.

The first two use cases describe situations where the RM actively requests information about DSL line resources from LQ&M in order to maintain admission control for service subscription and service invocation (request/response type of messages). The third use case shows a situation where LQ&M pushes information about changes in the actual DSL performance of a user towards the resource manager to adapt the admission control scheme (notification type of messages).

Figure 7:
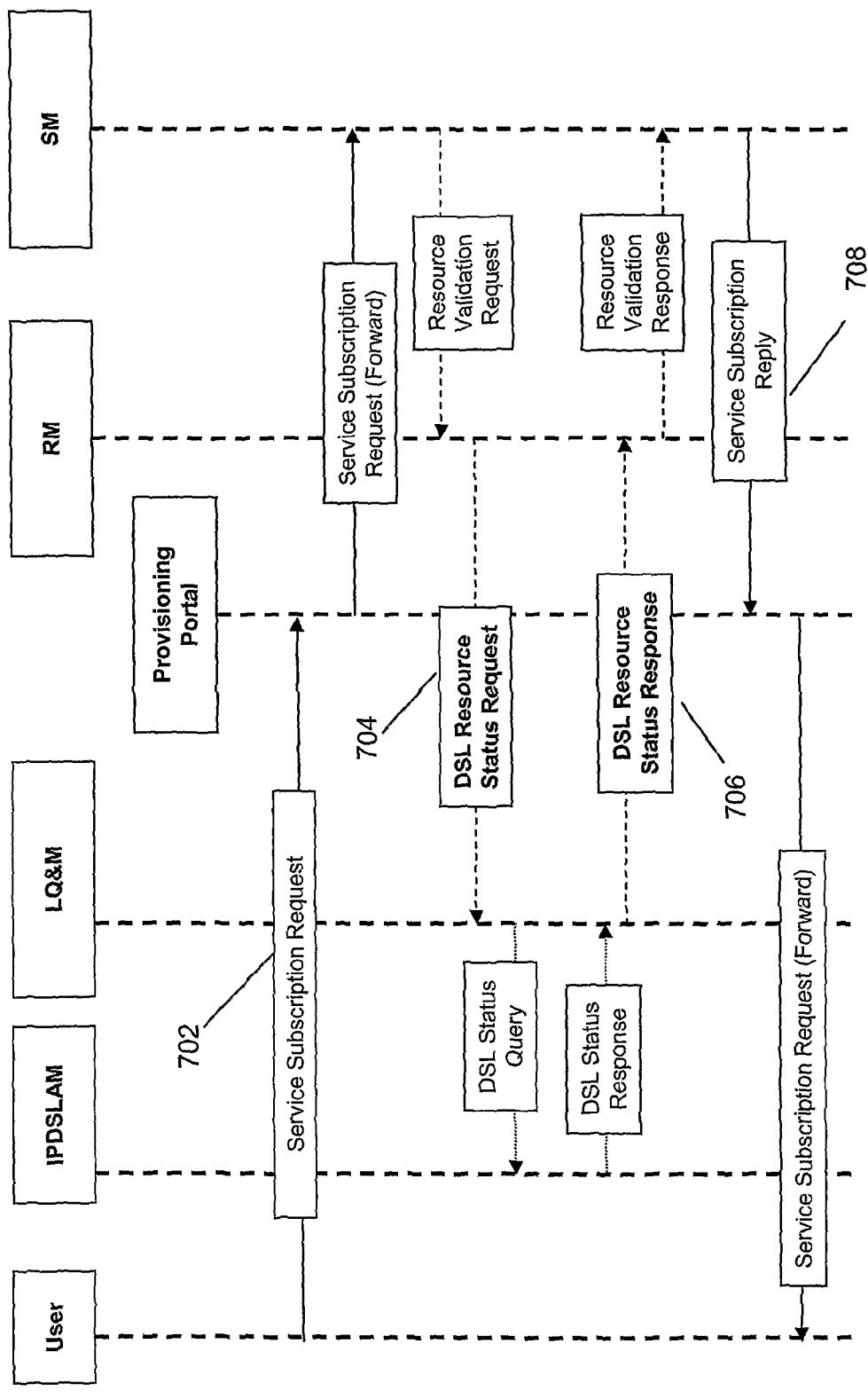
FIG. 7 depicts a high-level diagram of message flow for Use Case 1 in accordance with an embodiment of the present invention.

FIG. 7 depicts a high-level diagram of message flow for Use Case 1 in accordance with an embodiment of the present invention. The first use case describes the circumstances when a user creates a new service subscription through a self-provisioning portal. The user browses to a self-provisioning portal to subscribe for a new service (IPTV). The portal displays the different available services together with their accompanying SLA descriptions. When the user initiates the service subscription procedure, a service request 702 is sent to the service manager at the service provider side to notify of the user subscription request. This initiates a procedure to check if enough resources are available to deliver the service according to the SLA (Resource Validation Request). This request towards RM is translated into a DSL Resource Status Request 704 towards LQ&M that fetches the DSL status information via the SNMP interface. LQ&M will parse this information into a DSL Resource Status Response 706.

The DSL Resource Status Response message contains information of the total resource available on the DSL line.

RM will use this information to update the network data model and cross-reference with existing service on the line to verify if the necessary resource are available to fulfill the SLA. The result of which will be return in the Service Subscription Reply to the end user.

Figure 8:
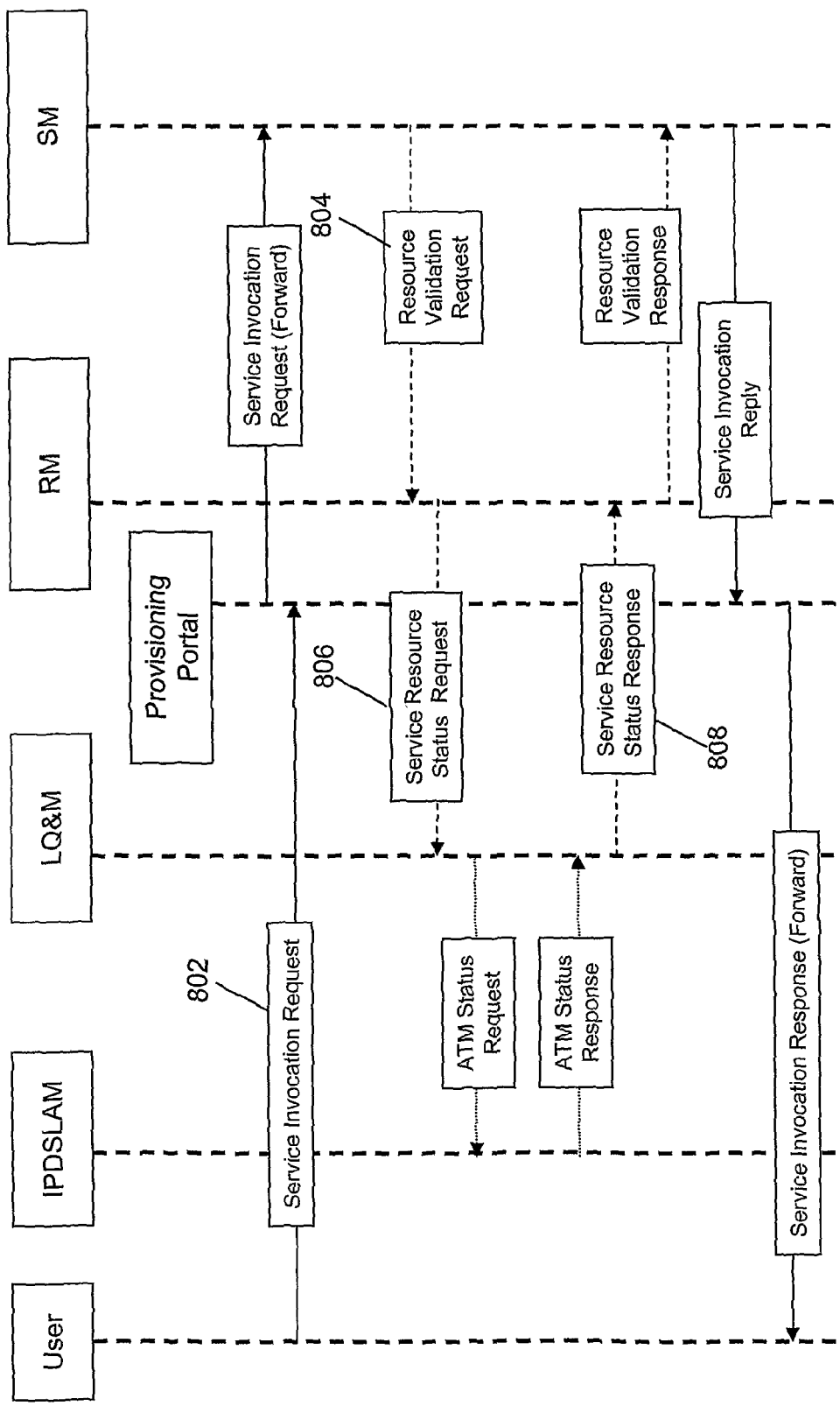
FIG. 8 illustrates a message flow for Use Case 2 in accordance with an embodiment of the present invention.

FIG. 8 illustrates a message flow for Use Case 2 in accordance with an embodiment of the present invention. Use case 2 assumes that a service subscription already exists and that a user (residential, business user, network operator, service provider) wishes to invoice the service through the self-provisioning portal (note that the service invocation is not required to be initiated through the portal).

Service invocation 802 is issued to the service manager when the user selects the service to invoke from the portal. This will trigger Resource Validation Request 804 to RM, which in turn probes LQ&M with ATM Resource Status Request 806. LQ&M will then read the ATM status information from the Internet Protocol Digital Subscriber Line Access Multiplexer (IPDSLAM) through the SNMP interface and send ATM Resource Status Response 808 to RM.

RM shall use the information in the response message in combination with the network data model and policy engine to determine availability of the requested resources. The result is sent to SM in the Resource Validation Reply, which then triggers an update of the self-provisioning portal.

During the invocation procedure the network resources are reserved; depending on the service type (unicast, multicast) and the user type (fixed, authenticated).

Figure 9:
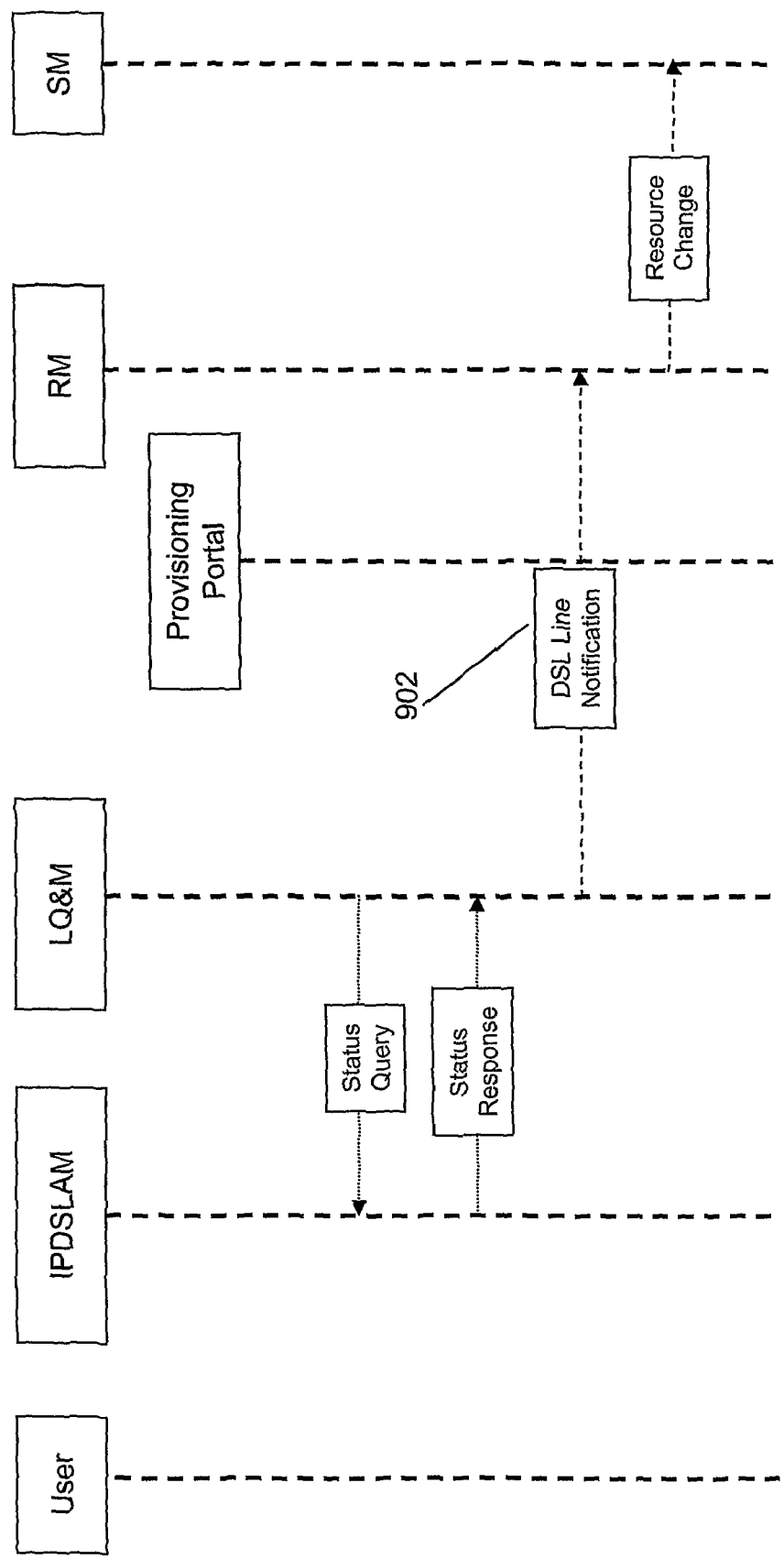
FIG. 9 depicts the notification function message flow in the LQ&M tool for Use Case 3 in accordance with an embodiment of the present invention.

FIG. 9 depicts a high-level message flow diagram for Use Case 3 in accordance with an embodiment of the present invention. LQ&M uses pre-configured threshold values to detect performance changes. If the LQ&M function detects a change in line performance due to altered conditions on the line (noise, failures) the function will report (push) a status change (performance change) to the RM. With this information, RM can adapt its admission control scheme used for service invocation, update its network data model, and also notify the service manager about the change. A DSL Line Notification is followed by a DSL Resource Status Request message to retrieve the new line values. This may not have any effect on the current services running, but will influence the availability of new service session invocations. The DSL Line Notification 902 message is used to inform the RM on status change of an access node (access node up/down). The DSL Line Notification message provides line-specific changes (an access node supports several lines) such as a line activating or going down.

A DSL Threshold Notification message (not shown) is sent by the access node if a predetermined threshold on a performance parameter is crossed, this message is used to check whether conditions on a line have changed. The RM uses this information to recover the QoS and QoE to fulfill the applicable Service Level Agreement (SLA).

A simple example is that the RM (OAM function) is made aware that something is wrong with a line and services are dropped. This function can be used for fast and automatic trouble shooting and fault localization.

Available line resources are important to relay to the resource manager during the resource negotiation process of setting up a service. The resource manager may query LQ&M to request the current line status of a particular PVC, port, and DSL access node. This information will be utilized by RM to apply necessary call admission control policies Line values may change due to the nature of DSL, based on outside interference, cross-talk, etc. This may lead to service degradation if certain line values are reached. LQ&M shall send a notification to RM when a specified attribute threshold is broken. The message can include the following information: access node id, port, PVC, VLAN, time, attribute and the new attribute value.

RM will apply appropriate policies on additional service that will be requested/activated based on the new line values. A notification from the LQ&M will trigger an update in the network data model used by RM.

Once the Resource Manager has committed resources for a specific service flow a notification is sent to the LQ&M function. The notification contains information on how to identify the service (access node identity and port) and parameter thresholds that will need to be monitored (i.e. SNR margins, CRC errors, bit rate, etc). This data will also define when to send line change notifications.

Current DSL line values may only be useful for short-term resource commitments. However, when creating a subscription or long-term resource reservations, such as for IPTV and VoIP usage, it may be important to take a historical view of DSL line stability. A line that experiences greater interference may not be suitable to deliver certain services, especially if the service provider wishes to provide service delivery guarantees. RM may contact LQ&M to get historical statistical values on specific user line read from the access node. Since LQ&M tracks performance/stability data from the access nodes and stores it in a database, it is possible to compute statistical performance indicators such as average rate and stability parameters.

A unified OAM and Resource Manager as described above provides a step towards a true e2e management system. Advantages include:

Service Assurance: SLA guarantees and QoS is possible by that solution because the LQ&M tools can monitor the actual service quality and compare with the agreed service layer agreement (SLA);

Dynamic Network View: The LQ&M tool always has a fresh view of the network in terms of topology, line-state and performance. The RM can always learn about the network structure it needs to make a decision;

Monitoring, Notifications, Pro-active Alarms: LQ&M enables automated and effective fault localization, fault diagnoses and fault repair mechanisms for DSL. This reduces OPEX costs due to line problems;

Nomadism on DSL: Since RM can query the LQ&M tools anytime on the resource statues for lines, the proposed solution also enables Nomadism. The RM knows if services that a user subscribed to on his home-line are also working on visited-lines; and Enables Self-Provisioning: Since the RM knows about the capacity and stability of lines, self-provisioning of services becomes possible (RM can decide if a service should be offered to a customer).

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A method, in a telecommunication system, of monitoring performance of an access network and reporting the performance to an access network resource manager in a core network, said method comprising the steps of:

collecting performance and stability data for nodes in the access network by a loop qualification and monitoring tool;

analyzing by the loop qualification and monitoring tool, the collected performance and stability data utilizing interpretation filters to derive key performance indicators for the access network;

comparing by the loop qualification and monitoring tool, the key performance indicators with corresponding threshold values for access network performance; and communicating between the loop qualification and monitoring tool and the access network resource manager over a web service-based interface, said communicating step including:

sending the key performance indicators for the access network to the access network resource manager in response to a query therefrom, wherein the query is received and the performance data is sent over the web service-based interface; and automatically sending notifications to the access network resource manager over the web service-based interface whenever the comparing step indicates that one of the key performance indicators exceeds a corresponding threshold value.

2. The method of claim 1, wherein the step of collecting performance and stability data includes monitoring line faults, change of noise-environment, and transport performance in the access network.

3. The method of claim 1, further comprising automatically sending reports to the access network resource manager over the web service-based interface whenever a fault in the access network is detected, diagnosed, or repaired.

4. The method of claim 1, wherein the web service-based interface is a Remote Procedure Call interface.

5. The method of claim 4, wherein the Remote Procedure Call interface is implemented utilizing Simple Object Access Protocol.

6. The method of claim 1, wherein the core network includes a service manager, and the method further comprises the steps of:

receiving in the service manager, a service request from a user;

sending a resource validation request from the service manager to the access network resource manager;

determining by the access network resource manager whether sufficient resources are available in the access network to provide the requested service to the user in accordance with a Service Level Agreement associated with the user;

sending a resource validation response from the access network resource manager to the service manager indicating whether sufficient resources are available; and approving or rejecting the service request based on the resource validation response.

7. The method of claim 6, wherein the step of determining by the access network resource manager whether sufficient resources are available includes sending a query to the loop qualification and monitoring tool over the web service-based interface regarding the availability of resources required for the requested service.

8. The method of claim 1, wherein the core network includes a service manager, and the method further comprises the access network resource manager performing the following steps:

adapting an admission control scheme in response to receiving a notification that one of the key performance indicators has exceeded a corresponding threshold value;

updating a data model of the access network; and notifying the service manager of a new performance indicator.

9. A loop qualification and monitoring tool in a telecommunication network for monitoring performance of an access network and reporting the performance to an access network resource manager in a core network, said tool comprising:

means for collecting performance and stability data for nodes in the access network;

an analyzer for analyzing the collected performance and stability data utilizing interpretation filters to derive key performance indicators for the access network;

means for connecting to a web service-based interface for sending the key performance indicators for the access network to the access network resource manager in response to a query therefrom;

means for comparing the key performance indicators with corresponding threshold values for access network performance; and communication means for automatically sending notifications to the access network resource manager over the web service-based interface whenever one of the key performance indicators exceeds a corresponding threshold value.

10. The tool of claim 9, wherein the means for collecting performance and stability data includes means for monitoring line faults, change of noise-environment, and transport performance in the access network.

11. The tool of claim 9, wherein the communication means includes means for automatically sending reports over the web service-based interface to the access network resource manager whenever a fault in the access network is detected, diagnosed, or repaired.

12. The tool of claim 9, wherein the web service-based interface is a Remote Procedure Call interface.

13. The tool of claim 12, wherein the Remote Procedure Call interface is implemented utilizing Simple Object Access Protocol.

14. The tool of claim 9, further comprising:

means for receiving a query from the access network resource manager regarding the availability of resources required for a service requested by an identified user;

means for determining whether sufficient resources are available in the access network to provide the requested service to the user in accordance with a Service Level Agreement associated with the user; and means for sending a status response to the access network resource manager indicating the availability of resources for the requested service.

15. A system in a telecommunication network for monitoring performance of an access network and allocating access network resources, said system comprising:

a loop qualification and monitoring tool for monitoring and reporting performance of the access network; and an access network resource manager in the core network communicating with the loop qualification and monitoring tool through a web service-based interface;

wherein the loop qualification and monitoring tool includes:

means for collecting performance and stability data for nodes in the access network;

an analyzer for analyzing the collected performance and stability data utilizing interpretation filters to derive key performance indicators for the access network;

means for connecting to the web service-based interface for sending the key performance indicators for the access network to the access network resource manager in response to a query therefrom;

means for comparing the key performance indicators with corresponding threshold values for access network performance; and communication means for automatically sending notifications to the access network resource manager over the web service-based interface whenever one of the key performance indicators exceeds a corresponding threshold value;

wherein the access network resource manager includes means for allocating access network resources based on the key performance indicators and notifications received from the loop qualification and monitoring tool.

16. The system of claim 15, wherein the means for collecting performance and stability data includes means for monitoring line faults, change of noise-environment, and transport performance in the access network.

17. The system of claim 15, wherein the communication means includes means for automatically sending reports to the access network resource manager over the web service-based interface whenever a fault in the access network is detected, diagnosed, or repaired.

18. The system of claim 15, wherein the web service-based interface is a Remote Procedure Call interface.

19. The system of claim 18, wherein the Remote Procedure Call interface is implemented utilizing Simple Object Access Protocol.

20. The system of claim 15, wherein the core network includes a service manager, and the system further comprises:

means in the service manager for receiving a service request from a user;

means for sending a resource validation request from the service manager to the access network resource manager;

means in the access network resource manager for determining whether sufficient resources are available in the access network to provide the requested service to the user in accordance with a Service Level Agreement associated with the user;

means for sending a resource validation response from the access network resource manager to the service manager indicating whether sufficient resources are available; and means in the service manager for approving or rejecting the service request based on the resource validation response.

21. The system of claim 20, wherein the means in the access network resource manager for determining whether sufficient resources are available includes means for sending a query to the loop qualification and monitoring tool over the web service-based interface regarding the availability of resources required for the requested service.

22. The system of claim 21, wherein the loop qualification and monitoring tool also includes:

means for receiving the query from the access network resource manager regarding the availability of resources for a requested service, said query identifying a requesting user;

means for determining whether sufficient resources are available in the access network to provide the requested service to the user in accordance with a Service Level Agreement associated with the requesting user; and means for sending a status response to the access network resource manager indicating the availability of resources for the requested service.

23. The system of claim 15, wherein the core network includes a service manager, and the access network resource manager also includes:

means for adapting an admission control scheme in response to receiving a notification that one of the key performance indicators has exceeded a corresponding threshold value;

means for updating a data model of the access network; and means for notifying the service manager of a new performance indicator.

* * * * *

UNITED STATES PATENT AND TRADEMARK OFFICE
CERTIFICATE OF CORRECTION

PATENT NO. : 8,223,656 B2  
APPLICATION NO. : 12/528761  
DATED : July 17, 2012  
INVENTOR(S) : Rius i Riu et al.

Page 1 of 1

It is certified that error appears in the above-identified patent and that said Letters Patent is hereby corrected as shown below:

On the title page, item (56), under "OTHER PUBLICATIONS", in Column 2, Line 6, delete "Qos" and insert -- QoS --, therefor.

In Column 2, Line 16, delete "user)" and insert -- user). --, therefor.

In Column 4, Line 44, delete "flow:" and insert -- flow --, therefor.

In Column 7, Line 10, delete "invoice" and insert -- invoke --, therefor.

In Column 7, Line 63, delete "policies" and insert -- policies. --, therefor.

In Column 8, Line 34, delete "layer" and insert -- level --, therefor.

Signed and Sealed this
Sixth Day of November, 2012

David J. Kappos
*Director of the United States Patent and Trademark Office*